United States Patent
Koban et al.

(10) Patent No.: US 12,297,387 B2
(45) Date of Patent: May 13, 2025

(54) AZEOTROPIC COMPOSITIONS OF HFO-1234YF AND PROPYLENE

(71) Applicant: THE CHEMOURS COMPANY FC, LLC, Wilmington, DE (US)

(72) Inventors: Mary E Koban, Chadds Ford, PA (US); Luke David Simoni, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 527 days.

(21) Appl. No.: 17/282,426

(22) PCT Filed: Oct. 2, 2019

(86) PCT No.: PCT/US2019/054181
§ 371 (c)(1),
(2) Date: Apr. 2, 2021

(87) PCT Pub. No.: WO2020/072571
PCT Pub. Date: Apr. 9, 2020

(65) Prior Publication Data
US 2021/0388251 A1    Dec. 16, 2021

Related U.S. Application Data

(60) Provisional application No. 62/741,261, filed on Oct. 4, 2018.

(51) Int. Cl.
*C09K 5/04*    (2006.01)
*F25B 45/00*    (2006.01)

(52) U.S. Cl.
CPC .............. *C09K 5/045* (2013.01); *F25B 45/00* (2013.01); *C09K 2205/126* (2013.01); *C09K 2205/24* (2013.01); *C09K 2205/32* (2013.01)

(58) Field of Classification Search
CPC ........................... C09K 5/045; C09K 2205/32
See application file for complete search history.

(56) References Cited

U.S. PATENT DOCUMENTS 5,932,775 A * 8/1999 Lacroix .................. C07C 17/42
570/103
2006/0243945 A1    11/2006 Minor et al.
(Continued)

FOREIGN PATENT DOCUMENTS

| CN | 107365568 A | 11/2017 |
| EP | 2 727 980 A1 | 5/2014 |
| JP | 2016056374 A | 4/2016 |

OTHER PUBLICATIONS

PCT International Search Report and Written Opinion for International Application No. PCT/US2019/054181 mailed Mar. 17, 2020.
(Continued)

*Primary Examiner* — Schyler S Sanks

(57) ABSTRACT

Refrigerant compositions including 2,3,3,3-tetrafluoropropene (HFO-1234yf) and propylene (R-1270) which exhibit near-azeotropic or azeotrope-like behavior. The refrigerant compositions exhibit a low global warming potential (GWP) and are non-ozone depleting. The refrigerant compositions are useful as a heating or cooling fluids in a variety of heating or cooling systems including heat pumps and other heating and cooling loops, in for example the automotive industry.

17 Claims, 6 Drawing Sheets

(56) References Cited

U.S. PATENT DOCUMENTS

| | | | |
|---|---|---|---|
| 2010/0123095 A1* | 5/2010 | Minor | C09K 5/045 |
| | | | 252/68 |
| 2011/0219791 A1 | 9/2011 | Rached | |
| 2013/0104575 A1* | 5/2013 | Kontomaris | F25B 30/00 |
| | | | 252/68 |
| 2017/0321099 A1 | 11/2017 | Sethi et al. | |
| 2017/0321938 A1 | 11/2017 | Cantadori | |
| 2018/0030325 A1 | 2/2018 | Petersen et al. | |
| 2018/0244970 A1 | 8/2018 | Rached | |

OTHER PUBLICATIONS

Gaved, Andrew, Honeywell unveils non-flammable AC refrigerant with GWP of 733, Jun. 28, 2018, RAC Weekly Newsletter.

Designation and Safety Classification of Refrigerants, ASHRAE Standard 34, 2016, pp. 1-42, Atlanta, Georgia.

Refrigerants—Designation and Safety Classification, ISO/FDIS 817, 2012, pp. 1-69, Geneva, Switzerland.

Designation and Safety Classification of Refrigerants, ASHRAE Standard 34, 2010, pp. 1-39, Atlanta, Georgia.

Standard Test Method for Kinematic Viscosity of Transparent and Opaque Liquids (and Calculation of Dynamic Viscosity), ASTM International, Designation: D445, 2018, West Conshohocken, Pennsylvania.

Standard Test Method for Concentration Limits of Flammability of Chemicals (Vapors and Gases), ASTM International, Designation: E681-2009 (Reapproved 2015), West Conshohocken, Pennsylvania.

Designation and Safety Classification of Refrigerants, ASHRAE Standard 34, 2010, Appendix HE1, pp. 1-44, Atlanta, Georgia.

Designation and Safety Classification of Refrigerants, ASHRAE Standard 34, 2013, Appendix HE2, pp. 1-46, Atlanta, Georgia.

Designation and Safety Classification of Refrigerants, ASHRAE Standard 34, 2016, ADDENDA g, pp. 1-8, Atlanta, Georgia.

Designation and Safety Classification of Refrigerants, ASHRAE Standard 34, 2016, Appendix HF, pp. 1-48, Atlanta, Georgia.

Designation and Safety Classification of Refrigerants, ASHRAE Standard 34, 2019, Appendix H, pp. 1-52, Atlanta, Georgia.

Designation and Safety Classification of Refrigerants, ASHRAE Standard 34, 2022, Appendix J, pp. 1-80, Atlanta, Georgia.

Standard Test Method for Kinematic Viscosity of Transparent or Opaque Liquids (and Calculation of Dynamic Viscosity)., ASTM Designation: D445-17A, 16 pages, 1996.

Standard Test Method for Kinematic Viscosity of Transparent or Opaque Liquids (and Calculation of Dynamic Viscosity)., ASTM Designation: D445-18, 15 pages, 1996.

Standard Test Method for Kinematic Viscosity of Transparent or Opaque Liquids (and Calculation of Dynamic Viscosity)., ASTM Designation: D445-19A, 6 pages, 1996.

Standard Test Method for Kinematic Viscosity of Transparent or Opaque Liquids (and Calculation of Dynamic Viscosity)., ASTM Designation: D445-21, 18 pages, 1996.

* cited by examiner

AZEOTROPIC COMPOSITIONS OF HFO-1234YF AND PROPYLENE

CROSS-REFERENCES TO RELATED APPLICATIONS

This application represents a national filing under 35 U.S.C. 371 of International Application No. PCT/US2019/054181, filed Oct. 2, 2019 and claims the benefit of U.S. Provisional Application No. 62/741,261, filed Oct. 4, 2018, which is incorporated by reference herein in its entirety.

FIELD

The present invention is directed to azeotropic and near azeotropic compositions of HFO-1234yf and propylene (R-290).

BACKGROUND

The automotive industry is going through an architecture platform rejuvenation from using an internal combustion engines (ICE) for propulsion to using electric batteries for propulsion. This platform rejuvenation is severely limiting the size of the internal combustion engine (ICE) in hybrid, plug-in hybrid vehicles or possibly eliminating the ICE altogether in pure electric vehicles. Some vehicles still maintain an ICE and are noted as hybrid electric vehicle (HEV) or plug-in hybrids electric vehicle (PHEV) or mild hybrids electric vehicles (MHEV). Vehicles which are fully electric and have no ICE are denoted as full electric vehicles (EVs). All HEV, PHEV, MHEV and EVs use at least one electric motor, where the electric motor provides some form of propulsion for the vehicles normally provided by the internal combustion engine (ICE) found on gasoline/diesel powered vehicles.

In electrified vehicles, the ICE is typically reduced in size (HEV, PHEV, or MHEV) or eliminated (EV) to reduce vehicle weight thereby increasing the electric drive-cycle. While the ICE's primary function is to provide vehicle propulsion, it also provides the necessary heat to the passenger cabin as its secondary function. Typically, heating is required when ambient conditions are 10° C. or lower. In a non-electrified vehicle, there is excess heat from the ICE, which can be scavenged and used to heat the passenger cabin. It should be noted that while the ICE may take some time to heat up and generate heat, it functions well to temperatures of −30° C. Therefore, in electrified vehicles, ICE size reduction or elimination is creating a demand for cost effective heating of the passenger cabin using a heat pump type fluid, i.e., a heat transfer fluid or working fluid which is capable of being used in the heating and/or in the cooling mode as the needs of the passenger cabin and battery management require heating and cooling.

Due to environmental pressures, the current automotive refrigerant, R-134a, a hydrofluorocarbon or HFC, is being phased out in favor of lower global warming potential (GWP) refrigerants with GWP <150. While HFO-1234yf, a hydrofluoro-olefin, meets the low GWP requirement (GWP=4 per Pappadimitriou and GWP <1 per AR5), it has lower refrigeration capacity and cannot fully meet the needs at low (−10° C.) to very low (−30° C.) ambient temperatures typically, without some type of system alteration or working fluid change.

Similarly, the heating and cooling of stationary residential and commercial structures also suffers from a lack of suitable low GWP refrigerants to replace the older high GWP refrigerants currently in use.

Due to the manner in which automotive vehicles are repaired or serviced, the fluid must have low or negligible glide. Currently, during the vehicle A/C repair or service process, refrigerant is handled through specific automotive service machines which recover the refrigerant, recycle the refrigerant to some intermittent quality level removing gross contaminants and then recharge the refrigerant back into the vehicle after repairs or servicing have been completed. These machines are denoted as R/R/R machines since they recover, recycle, recharge refrigerant. It is this on-site recovery, recycle and recharge of refrigerant during vehicle maintenance or repair, that low glide is preferable and negligible glide most preferable. The current automotive service machines are not set-up to handle refrigerant with high glide or glide. Since the refrigerant is handled "on-site" at a vehicle repair shop, there is no opportunity to reconstitute a blend refrigerant to the correct composition such as is done at a refrigerant recycler. Refrigerants with higher glide can sometimes require "reconstitution" to the original formulation otherwise there will be a loss in cycle performance. Since a heat pump fluid would be handled in the same manner as the air-conditioning fluid, this requirement for low or no glide would also apply for a heat pump type fluid as it would be handled and/or serviced in the same manner as the traditional air-conditioning fluids. Thus, there is a need for refrigerants which have low or no glide for automotive applications.

Therefore, there is a need for low GWP heat pump type fluids to meet the ever-increasing needs of hybrid, mild hybrid, plug-in hybrid and electric vehicles, electrified mass transport, and residential and commercial structures for thermal management which can provide cooling and heating.

SUMMARY

The present invention relates to compositions of environmentally friendly refrigerant blends with ultra-low GWP, (GWP less than or equal to 10 GWP), low toxicity (class A per ANSI/ASHRAE standard 34 or ISO standard 817), and low flammability (class 2L per ASHRAE 34 or ISO 817) for use in a hybrid, mild hybrid, plug-in hybrid, or full electric vehicles for thermal management (transferring heat from one part of the vehicle to the other) of the passenger compartment providing air conditioning (A/C) or heating to the passenger cabin. These refrigerants can also be used for mass transport mobile applications which benefit from heat pump type heating and cooling of passenger cabin areas. Mass transport mobile applications are not limited to, but can include transport vehicles such as ambulances, shuttles, buses and trains.

Compositions of the present invention exhibit low temperature glide over the operating conditions of vehicle thermal management systems. In one aspect of the invention, the refrigerant compositions include mixtures of HFO-1234yf and propylene exhibiting near-azeotropic behavior. In another aspect of the invention, the refrigerant compositions include mixtures of HFO-1234yf and propylene exhibiting azeotropic-like behavior.

The present invention includes the following aspects and embodiments:

In one embodiment, disclosed herein are compositions useful as refrigerants and heat transfer fluids. The compositions disclosed herein comprise: 2,3,3,3-tetrafluoropropene (HFO-1234yf) and propylene (R-1270); wherein the composition is near-azeotropic.

According to any of the foregoing embodiments, also disclosed herein are compositions wherein the composition is azeotrope-like.

According to any of the foregoing embodiments, also disclosed herein are compositions wherein the 2,3,3,3-tetrafluoropropene (HFO-1234yf) concentration is greater than or equal to the 2,3,3,3-tetrafluoropropene (HFO-1234yf) concentration of a propylene NAL1; and wherein the 2,3,3,3-tetrafluoropropene (HFO-1234yf) concentration is less than or equal to the 2,3,3,3-tetrafluoropropene (HFO-1234yf) concentration of a propylene NAH1.

According to any of the foregoing embodiments, also disclosed herein are compositions wherein the 2,3,3,3-tetrafluoropropene (HFO-1234yf) concentration is greater than or equal to the 2,3,3,3-tetrafluoropropene (HFO-1234yf) concentration of a propylene ALL1; and wherein the 2,3,3,3-tetrafluoropropene (HFO-1234yf) concentration is less than or equal to the 2,3,3,3-tetrafluoropropene (HFO-1234yf) concentration of a propylene ALH1.

According to any of the foregoing embodiments, also disclosed herein are compositions wherein the propylene (R-1270) is present in an amount up to 24 weight percent, based on the total refrigerant composition.

According to any of the foregoing embodiments, also disclosed herein are compositions wherein the propylene (R-1270) is from 1 to 20 weight percent based on the total refrigerant composition.

According to any of the foregoing embodiments, also disclosed herein are compositions wherein the propylene (R-1270) is present in an amount from 1 to 10 weight percent based on the total refrigerant composition.

According to any of the foregoing embodiments, also disclosed herein are compositions wherein the propylene (R-1270) is present in an amount from 1 to 7 weight percent based on the total refrigerant composition.

According to any of the foregoing embodiments, also disclosed herein are compositions wherein the composition exhibits near azeotropic properties over the temperature range of −30° C. to 40° C.

According to any of the foregoing embodiments, also disclosed herein are compositions wherein the refrigerant composition is a heat pump fluid.

According to any of the foregoing embodiments, also disclosed herein are compositions wherein the heat capacity of the refrigerant composition is between 2.9% and 27.5% greater than the heat capacity of 2,3,3,3-tetrafluoropropene (HFO-1234yf) alone.

According to any of the foregoing embodiments, also disclosed herein are compositions wherein the heat capacity of the refrigerant composition is between 2% and 22% greater than the heat capacity of 2,3,3,3-tetrafluoropropene (HFO-1234yf) alone.

According to any of the foregoing embodiments, also disclosed herein are compositions wherein the GWP of the refrigerant composition is less than 10.

According to any of the foregoing embodiments, also disclosed herein are compositions wherein the refrigerant composition has a temperature glide of less than 1.1 Kelvin (K) at temperature of −30° C. up to 10° C.

According to any of the foregoing embodiments, also disclosed herein are compositions wherein a ratio of a heat capacity of the composition to a heat capacity of 2,3,3,3-tetrafluoropropene (HFO-1234yf) is between 1.05 and 1.50 at the same temperature and pressure.

In another embodiment, disclosed herein a heating or cooling system comprising, in a serial arrangement: a condenser; an evaporator; and a compressor, the system further comprising each of the condenser, evaporator and compressor operably connected, the refrigerant composition of any of the foregoing embodiments being circulated through each of the condenser, evaporator and compressor.

According to any of the foregoing embodiments, also disclosed herein are heating or cooling systems wherein the system is an air conditioner for an automotive system.

According to any of the foregoing embodiments, also disclosed herein are heating or cooling systems wherein the system is an air conditioner for a stationary cooling system.

According to any of the foregoing embodiments, also disclosed herein are heating or cooling systems further comprising a 4-way valve.

According to any of the foregoing embodiments, also disclosed herein are heating or cooling systems wherein the system is a heat pump for an automotive system.

According to any of the foregoing embodiments, also disclosed herein are heating or cooling systems wherein the system is heat pump for a residential heating or cooling system.

According to any of the foregoing embodiments, also disclosed herein are heating or cooling systems wherein a temperature glide is less than 1.1 Kelvin (K).

According to any of the foregoing embodiments, also disclosed herein is the use of the refrigerant composition of any of the foregoing embodiments in a heat pump system.

According to any of the foregoing embodiments, also disclosed herein is the use of the refrigerant composition of any of the foregoing embodiments in an HEV, MHEV, PHEV, or EV heat pump system.

According to any of the foregoing embodiments, also disclosed herein is the use of the refrigerant composition of any of the foregoing embodiments in an HEV, MHEV, PHEV, or EV heat pump system in combination with a vehicle electrical system.

According to any of the foregoing embodiments, also disclosed herein is a method of charging a refrigerant composition to an automotive system that includes providing the composition of any of the foregoing embodiments to an automotive heating or cooling system.

In another embodiment, disclosed herein a method for improving gross contaminants from a refrigerant composition comprising: providing a first refrigerant composition; wherein the first refrigerant composition is not near azeotropic and includes 2,3,3,3-tetrafluoropropene (HFO-1234yf) and at least one of ethane (R-170) or propane (R-290); providing at least one of 2,3,3,3-tetrafluoropropene (HFO-1234yf), ethane (R-170) or propane (R-290) to the first refrigerant composition to form a second refrigerant composition; wherein the second refrigerant composition is near-azeotropic.

According to any of the foregoing embodiments, also disclosed herein is a method wherein the second refrigerant composition is formed from the first refrigerant composition without the use of conventional onsite automatic recovery, recycle, recharge equipment.

Other features and advantages of the present invention will be apparent from the following more detailed description of the preferred embodiment which illustrates, by way of example, the principles of the invention.

DETAILED DESCRIPTION

Definitions

Figure 1:
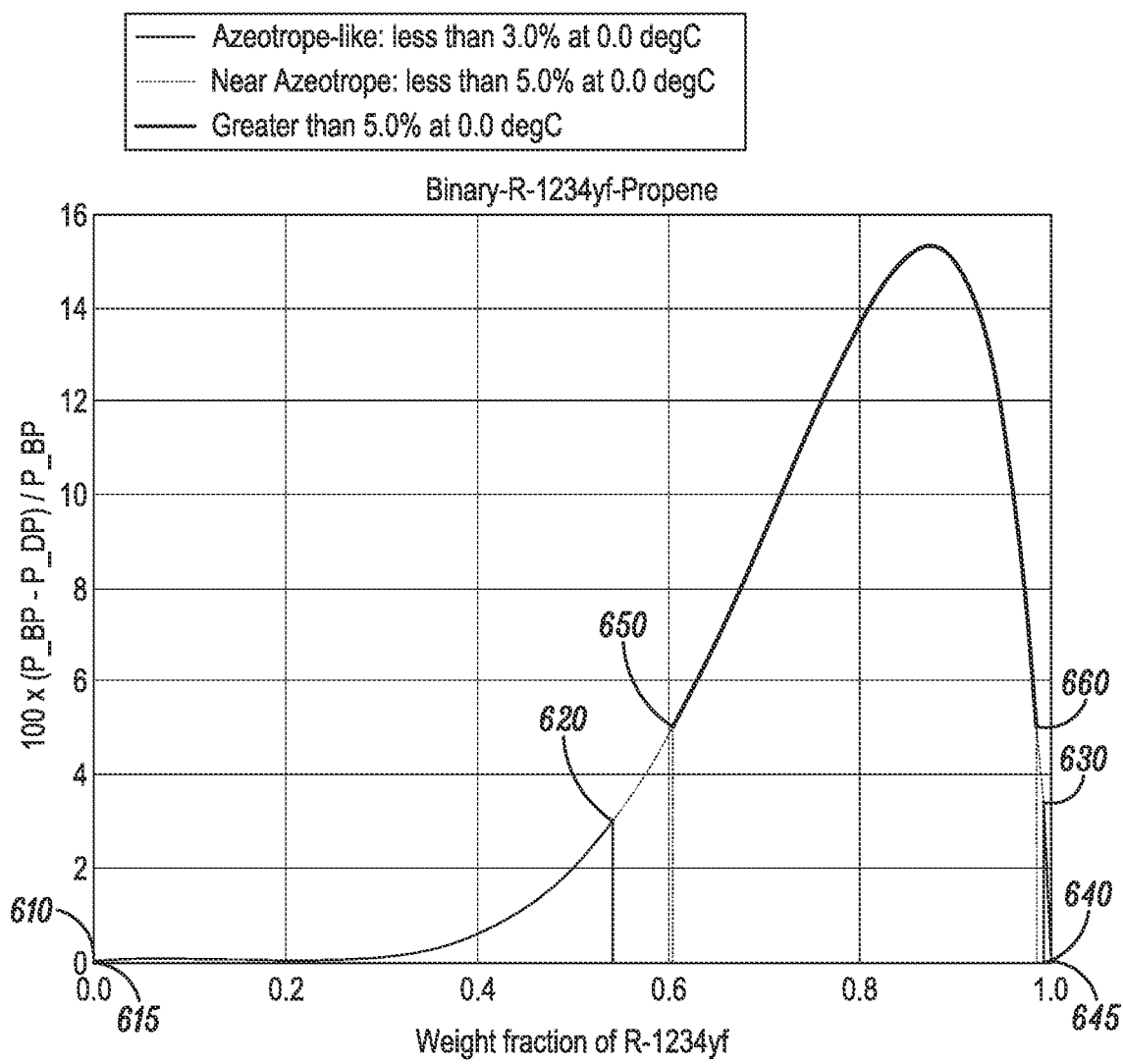
FIG. 1 illustrates the vapor/liquid equilibrium properties of blends of HFO-1234yf and propylene, according to an embodiment.

As used herein, the term heat transfer composition means a composition used to carry heat from a heat source to a heat sink.

A heat source is defined as any space, location, object or body from which it is desirable to add, transfer, move or remove heat. Example of a heat source in this embodiment is the vehicle passenger compartment requiring air conditioning.

A heat sink is defined as any space, location, object or body capable of absorbing heat. An example of a heat sink in this embodiment is the vehicle passenger compartment requiring heating.

A heat transfer system is the system (or apparatus) used to produce a heating or cooling effect in a particular location. A heat transfer system in this invention implies the reversible heating or cooling system which provides heating or cooling of the passenger cabin. Sometimes this system is called a heat pump system, reversible heating loop, or reversible cooling loop.

A heat transfer fluid comprises at least one refrigerant and at least one member selected from the group consisting of lubricants, stabilizers and flame suppressants.

Refrigeration capacity (also referred to as cooling or heating capacity, depending on which is the preferred requirement for the system) is a term which defines the change in enthalpy of a refrigerant in an evaporator per kilogram of refrigerant circulated, or the heat removed by the refrigerant in the evaporator per unit volume of refrigerant vapor exiting the evaporator (volumetric capacity). The refrigeration capacity is a measure of the ability of a refrigerant or heat transfer fluid composition to produce cooling or heating Therefore, the higher the capacity, the greater the cooling or heating that is produced. Cooling rate refers to the heat removed by the refrigerant in the evaporator per unit time. Heating rate refers to the heat removed by the refrigerant in the evaporator per unit time.

Coefficient of performance (COP) is the amount of heat removed divided by the required energy input to operate the cycle. The higher the COP, the higher is the energy efficiency of the refrigerant or heat transfer fluid. COP is directly related to the energy efficiency ratio (EER) that is the efficiency rating for refrigeration or air conditioning equipment at a specific set of internal and external temperatures.

Subcooling refers to the reduction of the temperature of a liquid below that liquid's saturation point for a given pressure. The liquid saturation point is the temperature at which the vapor is completely condensed to a liquid. Subcooling continues to cool the liquid to a lower temperature liquid at the given pressure. By cooling a liquid below the saturation temperature (or bubble point temperature), the net refrigeration capacity can be increased. Subcooling thereby improves refrigeration capacity and energy efficiency of a system. The subcool amount is the amount of cooling below the saturation temperature (in degrees).

Superheating refers to the increase of the temperature of a vapor above that vapor's saturation point for a given pressure. The vapor saturation point is the temperature at which the liquid is completely evaporated to a vapor. Superheating continues to heat the vapor to a higher temperature vapor at a given pressure. By heating the vapor above the saturation temperature (or dew point temperature), the net refrigeration capacity can be increased. Superheating thereby improves refrigeration capacity and energy efficiency of a system. The superheat amount is the amount of heating above the saturation temperature (in degrees).

Temperature glide (sometimes referred to simply as "glide") is the absolute value of the difference between the starting and ending temperatures of a phase-change process by a refrigerant within a heat exchanger (evaporator or condenser) of a refrigerant system, exclusive of any subcooling or superheating. This term may be used to describe condensation or evaporation of a near azeotrope or non-azeotropic composition. When referring to the temperature glide of an air conditioning or heat pump system, it is common to provide the average temperature glide being the average of the temperature glide in the evaporator and the temperature glide in the condenser. Glide is applicable to blend refrigerants, i.e. refrigerants that are composed of at least 2 components.

As used herein, the term low glide shall be understood as less than 3 Kelvin (K) over the operating range of interest. In some embodiments, the glide may be than 2.5 K over operating range of interest or even less than 0.75 K over operating range of interest.

By azeotropic composition is meant a constant-boiling mixture of two or more substances that behave as a single substance. One way to characterize an azeotropic composition is that the vapor produced by partial evaporation or distillation of the liquid has the same composition as the liquid from which it is evaporated or distilled, i.e., the mixture distills/refluxes without compositional change. Constant-boiling compositions are characterized as azeotropic because they exhibit either a maximum or minimum boiling point, as compared with that of the non-azeotropic mixture of the same compounds. An azeotropic composition will not fractionate within an air conditioning or heating system during operation. Additionally, an azeotropic composition will not fractionate upon leakage from an air conditioning or heating system.

As used herein, the terms "near-azeotropic composition" shall be understood to mean a composition wherein the difference between the bubble point pressure ("BP") and dew point pressure ("DP") of the composition at a particular temperature is less than or equal to 5 percent based upon the bubble point pressure, i.e., $[(BP-DP)/BP] \times 100 \leq 5$.

As used herein, the term "azeotrope-like composition" shall be understood to mean a composition wherein the difference between the bubble point pressure ("BP") and dew point pressure ("DP") of the composition at a particular temperature is less than or equal to 3 percent based upon the bubble point pressure, i.e., $[(BP-DP)/BP] \times 100 \leq 3$.

As used herein, the term "first near-azeotropic low HFO-1234yf composition (NAL1)" shall be understood to mean the lowest concentration of HFO-1234yf of a compositional range exhibiting near-azeotropic behavior of an HFO-1234yf/propylene mixture.

As used herein, the term "first near-azeotropic high HFO-1234yf composition (NAH1)" shall be understood to mean the highest concentration of HFO-1234yf of a compositional range exhibiting near-azeotropic behavior of an HFO-1234yf/propylene mixture.

As used herein, the term "first azeotrope-like low HFO-1234yf composition (ALL1)" shall be understood to mean the lowest concentration of HFO-1234yf of a compositional range exhibiting azeotrope-like behavior of an HFO-1234yf/propylene mixture.

As used herein, the term "first azeotrope-like high HFO-1234yf composition (ALH1)" shall be understood to mean the highest concentration of HFO-1234yf of a compositional range exhibiting azeotrope-like behavior of an HFO-1234yf/propylene mixture.

As used herein, the term "second near-azeotropic low HFO-1234yf composition (NAL2)" shall be understood to mean the lowest concentration of HFO-1234yf of a compositional range exhibiting near-azeotropic behavior of an HFO-1234yf/propylene mixture.

As used herein, the term "second near-azeotropic high HFO-1234yf composition (NAH2)" shall be understood to mean the highest concentration of HFO-1234yf of a compositional range exhibiting near-azeotropic behavior of an HFO-1234yf/propylene mixture.

As used herein, the term "second azeotrope-like low HFO-1234yf composition (ALL2)" shall be understood to mean the lowest concentration of HFO-1234yf of a compositional range exhibiting azeotrope-like behavior of an HFO-1234yf/propylene mixture.

As used herein, the term "second azeotrope-like high HFO-1234yf composition (ALH2)" shall be understood to mean the highest concentration of HFO-1234yf of a compositional range exhibiting azeotrope-like behavior of an HFO-1234yf/propylene mixture.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method that includes materials, steps, features, components, or elements, in addition to those literally disclosed provided that these additional included materials, steps, features, components, or elements do materially affect the basic and novel characteristic(s) of the claimed invention, especially the mode of action to achieve the desired result of any of the processes of the present invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also include such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Refrigerant Blend (Class A2, GWP <10 and 0 ODP)

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100-year time horizon is commonly the value referenced in the industry and shall be used herein. For fluid mixtures or refrigerant mixtures, a weighted average can be calculated based on the individual GWPs for each component. The United Nations Intergovernmental Panel on Climate Control (IPCC) provides vetted values for refrigerant GWPs in official assessment reports (ARs.) The fourth assessment report is denoted as AR4 and the fifth assessment report is denoted as AR5. Regulating bodes are currently using AR4 for official legislating purposes.

Ozone-depletion potential (ODP) is a number that refers to the amount of ozone depletion caused by a substance. The ODP is the ratio of the impact on ozone of a chemical compared to the impact of a similar mass of R-11 or fluorotrichloromethane. R-11 is a type of chlorofluorocarbon (CFC) and as such has chlorine in it which contributes to ozone depletion. Furthermore, the ODP of CFC-11 is defined to be 1.0. Other CFCs and hydrofluorochlorocarbons (HCFCs) have ODPs that range from 0.01 to 1.0. Hydrocarbons (HC's) and the hydrofluoro-olefins (HFO's) described herein have zero ODP because they do not contain chlorine, bromine or iodine, species known to contribute to ozone breakdown and depletion. Hydrocarbons (HC's) also do not have ODP as they by definition also do not contain chlorine, bromine or iodine.

The refrigerant blend compositions comprise at least one hydrofluoro-olefin such as 2,3,3,3-tetrafluoropropene (HFO-1234yf) and at least one hydrocarbon such as propylene (R-1270).

The unsaturated hydrofluoro-olefin (HFO) refrigerant components also have very low GWP, with all HFO components having GWP <10. The hydrocarbon (HC) refrigerant component includes propylene. The HC component also has a very low GWP. For example, propylene has a GWP of 2.

Therefore, the final blends have 0 ODP and ultra-low GWP, or GWP <10. Table 1, shown below, is a summary table showing type, ODP and GWP per the $4^{th}$ and the $5^{th}$ assessment conducted by the Intergovernmental Panel on Climate Control (IPCC) for 2,3,3,3-tetrafluoropropene (HFO-1234yf), and various combinations thereof.

For the blend, GWP may be calculated as a weighted average of the individual GWP values in the blend, taking into account the amount (e.g., weight %) of each ingredient (1-n) in the blend, as shown in Equation (1) below.

GWP Blend=Amount1 (GWP of component 1)+Amount2 (GWP component 2)+Amount $n$ (GWP of component $n$)   Equation (1):

TABLE 1

| Refrigerant | Refrigerant Type | ODP | GWP AR4 (IPCC) | GWP AR5 (IPCC) |
|---|---|---|---|---|
| R-12 | CFC | 1 | 10900 | 10200 |
| R-134a | HFC | 0 | 1430 | 1300 |
| R-1234yf | HFO | 0 | 4 | 1 |
| R-1270 | HC | 0 | 2 | 2 |
| R-1234yf/R-1270 (99 wt %/1 wt %) | HFO/HC | 0 | 4.0 | 1.0 |
| R-1234yf/R-1270 (95 wt %/5 wt %) | HFO/HC | 0 | 3.9 | 1.1 |
| R-1234yf/R-1270 (90 wt %/10 wt %) | HFO/HC | 0 | 3.7 | 1.1 |
| R-1234yf/R-1270 (76.2 wt %/23.8 wt %) | HFO/HC | 0 | 3.5 | 1.3 |

Resultant GWP for several blends of interest for HFO-1234yf and R-1270 are noted below. Blends with R-1270 were limited to 23.8 wt % so that the resultant blend would meet the ASHRAE class 2 flammability requirements. Due to the ultra-low GWPs of both HFO-1234yf and R-1270, blends which contain up to 23.8 wt % of R-1270 will have final GWP less than 5 based on IPCC AR4 and even lower than GWP of 2 based on IPCC AR5.

Refrigerant Lubricant

The refrigerant or heat transfer compositions of the present invention can be mixed with a lubricant and used as a "complete working fluid composition" of the present invention. The refrigerant composition of the present invention containing the heat transfer or working fluid of the present invention and the lubricant may contain publicly known additives such as a stabilizer, a leakage detection material, and other beneficial additives. It is also possible for the lubricant to impact the flammability level of the resulting compound.

The lubricant chosen for this composition preferably has sufficient solubility in the vehicle's A/C refrigerant to ensure that the lubricant can return to the compressor from the evaporator. Furthermore, the lubricant preferably has a relatively low viscosity at low temperatures so that the lubricant is able to pass through the cold evaporator. In one preferred embodiment, the lubricant and A/C refrigerant are miscible over a broad range of temperatures.

Preferred lubricants may be one or more polyol ester type lubricants. (POEs). Polyol ester as used herein include compounds containing an ester of a diol or a polyol having from about 3 to 20 hydroxyl groups and a fatty acid having from about 1 to 24 carbon atoms is preferably used as the polyol. An ester which can be used as the base oil. (EUROPEAN PATENT APPLICATION published in accordance with Art. 153(4) EP 2 727 980 A1, which is hereby incorporated by reference). Here, examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, 1,12-dodecanediol, and the like.

Examples of the above-described polyol include a polyhydric alcohol such as trimethylolethane, trimethylolpropane, trimethylolbutane, di(trimethylolpropane), tri(trimethylolpropane), pentaerythritol, di(pentaerythritol), tri(pentaerythritol), glycerin, polyglycerin (dimer to eicosamer of glycerin), 1,3,5-pentanetriol, sorbitol, sorbitan, a sorbitol-glycerin condensate, adonitol, arabitol, xylitol, mannitol, etc.; a saccharide such as xylose, arabinose, ribose, rhamnose, glucose, fructose, galactose, mannose, sorbose, cellobiose, maltose, isomaltose, trehalose, sucrose, raffinose, gentianose, melezitose, etc.; partially etherified products and methyl glucosides thereof; and the like. Among these, a hindered alcohol such as neopentyl glycol, trimethylolethane, trimethylolpropane, trimethylolbutane, di(trimethylolpropane), tri(trimethylolpropane), pentaerythritol, or di(pentaerythritol), tri(pentaerythritol) is preferable as the polyol.

Though the fatty acid is not particularly limited on its carbon number, in general, a fatty acid having from 1 to 24 carbon atoms is used. In the fatty acid having from 1 to 24 carbon atoms, a fatty acid having 3 or more carbon atoms is preferable, a fatty acid having 4 or more carbon atoms is more preferable, a fatty acid having 5 or more carbon atoms is still more preferable, and a fatty acid having 10 or more carbon atoms is the most preferable from the standpoint of lubricating properties. In addition, a fatty acid having not more than 18 carbon atoms is preferable, a fatty acid having not more than 12 carbon atoms is more preferable, and a fatty acid having not more than 9 carbon atoms is still more preferable from the standpoint of compatibility with the refrigerant.

In addition, the fatty acid may be either of a linear fatty acid and a branched fatty acid, and the fatty acid is preferably a linear fatty acid from the standpoint of lubricating properties, whereas it is preferably a branched fatty acid from the standpoint of hydrolysis stability. Furthermore, the fatty acid may be either of a saturated fatty acid and an unsaturated fatty acid. Specifically, examples of the above-described fatty acid include a linear or branched fatty acid such as pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, oleic acid, etc.; a so-called neo acid in which a carboxylic group is attached to a quaternary carbon atom; and the like. More specifically, preferred examples thereof include valeric acid (n-pentanoic acid), caproic acid (n-hexanoicacid), enanthic acid (n-heptanoic acid), caprylic acid (n-octanoic acid), pelargonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid, 3,5,5-trimethylhexanoic acid, and the like. Incidentally, the polyol ester maybe a partial ester in which the hydroxyl groups of the polyol remain without being fully esterified; a complete ester in which all of the hydroxyl groups are esterified; or a mixture of a partial ester and a complete ester, with a complete ester being preferable.

In the polyol ester, an ester of a hindered alcohol such as neopentyl glycol, trimethylolethane, trimethylolpropane, trimethylolbutane, di(trimethylolpropane), tri(trimethylolpropane), pentaerythritol, di(pentaerythritol), tri(pentaerythritol), etc. is more preferable, with an ester of neopentyl glycol, trimethylolethane, trimethylolpropane, trimethylolbutane, or pentaerythritol being still more preferable, from the standpoint of more excellent hydrolysis stability; and an ester of pentaerythritol is the most preferable from the standpoint of especially excellent compatibility with the refrigerant and hydrolysis stability.

Preferred specific examples of the polyol ester include a diester of neopentyl glycol with one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolethane with one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolpropane with one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3, 5, 5-trimethylhexanoic acid; a triester of trimethylolbutane with one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester of pentaerythritol with one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid. Incidentally, the ester with two or more kinds of fatty acids may be a mixture of two or more kinds of esters of one kind of a fatty acid and a polyol, and an ester of a mixed fatty acid of two or more kinds thereof and a polyol, particularly an ester of a mixed fatty acid and a polyol is excellent in low-temperature properties and compatibility with the refrigerant.

In a preferred embodiment, the lubricant is soluble in the refrigerant at temperatures between about −35° C. and about 100° C., and more preferably in the range of about −30° C. and about 40° C., and even more specifically between −25° C. and 40° C. In another embodiment, attempting to maintain the lubricant in the compressor is not a priority and thus high temperature insolubility is not preferred.

The lubricant used for electrified automotive air-conditioning application may have a kinematic viscosity (measured at 40° C., according to ASTM D445) between 75-110 cSt, and ideally about 80 cSt-100 cSt and most specifically, between 85 cst-95 cSt. However, not wanting to limit the invention, it should be noted that other lubricant viscosities may be used depending on the needs of the electrified vehicle A/C compressor.

To suppress the hydrolysis of the lubricating oil, it is necessary to control the moisture concentration in the heating/cooling system for electric type vehicles. Therefore, the lubricant in this embodiment needs to have low moisture, typically less than 100 ppm by weight.

Refrigerant Stabilizers

HFO type refrigerants, due to the presence of a double bond, may be subject to thermal instability and decompose under extreme use, handling or storage situations. Therefore, there may be advantages to adding stabilizers to HFO type refrigerants. Stabilizers may notably include nitromethane, ascorbic acid, terephthalic acid, azoles such as tolutriazole or benzotriazole, phenolic compounds such as tocopherol, hydroquinone, t-butyl hydroquinone, 2,6-di-tertbutyl-4-methylphenol, epoxides (possibly fluorated or perfluorated alkyl epoxides or alkenyl or aromatic epoxides) such as n-butyl glycidyl ether, hexanediol diglycidyl ether, allyl glycidyl ether, butylphenylglycidyl ether, terpenes, such as d-limonene or alpha and beta-pinene, phosphites, phosphates, phosphonates, thiols and lactones.

Not wanting to be prescriptive, blends may or may not include stabilizers depending on the requirements of the system being used. If the refrigerant blend does include a stabilizer, it may include any amount from 0.01 weight percent up to 1 weight percent of any of the stabilizers listed above, but most preferably tocopherol, or d-limonene.

Refrigerant Blend Flammability

Flammability is a term used to mean the ability of a composition to ignite and/or propagate a flame. For refrigerants and other heat transfer compositions or working fluids, the lower flammability limit ("LFL") is the minimum concentration of the heat transfer composition in air that is capable of propagating a flame through a homogeneous mixture of the composition and air under test conditions specified in ASTM (American Society of Testing and Materials) E681. The upper flammability limit ("UFL") is the maximum concentration of the heat transfer composition in air that is capable of propagating a flame through a homogeneous mixture of the composition and air under the same test conditions.

In order to be classified by ANSI/ASHRAE (American Society of Heating, Refrigerating and Air-Conditioning Engineers) as (class 1, no flame propagation), a refrigerant must meet the conditions of ASTM E681 as formulated in both the liquid and vapor phase as well as non-flammable in both the liquid and vapor phases that result during leakage scenarios.

In order for a refrigerant to be classified by ANSI/ASHRAE (American Society of Heating, Refrigerating and Air-Conditioning Engineers) as low flammability (class 2L), the refrigerant: 1) exhibits flame propagation when tested at 140° F. (60° C.) and 14.7 psia (101.3 kPa), 2) has an LFL >0.0062 lb/ft$^3$ (0.10 kg/m3), 3) a maximum burning velocity of ≤3.9 in./s (10 cm/s) when tested at 73.4° F. (23.0° C.) and 14.7 psia (101.3 kPa). and 4) has a heat of combustion <8169 Btu/lb (19,000 kJ/kg). 2,3,3,3-tetrafluoropropene (HFO-1234yf) has ANSI/ASHRAE standard 34 class 2L flammability rating.

In order for a refrigerant to be classified by ANSI/ASHRAE Standard 34 class 2, the refrigerant 1) exhibits flame propagation when tested at 140° F. (60° C.) and 14.7 psia (101.3 kPa), 2) has an LFL >0.0062 lb/ft$^3$ (0.10 kg/m$^3$) and 3) has a heat of combustion <8169 Btu/lb (19,000 kJ/kg).

In order for a refrigerant to be classified by ANSI/ASHRAE standard 34 class 3, refrigerant 1) exhibits flame propagation when tested at 140° F. (60° C.) and 14.7 psia (101.3 kPa), 2) has an LFL <0.0062 lb/ft$^3$ (0.10 kg/m$^3$) or 3) has a heat of combustion >8169 Btu/lb (19,000 kJ/kg).

When the HFO component and the HC components are blended together in the correct proportions, the resulting blend has class 2 flammability as defined by ANSI/ASHRAE standard 34 and ISO 817. Class 2 flammability is inherently less flammable (i.e., lower energy release as exemplified by the Heat of Combustion or HOC value) than class 3 flammability and can be managed in automotive heating/cooling systems.

ASHRAE Standard 34 provides a methodology to calculate the heat of combustion for refrigerant blends using a balanced stoichiometric equation based on the complete combustion of one mole of refrigerant with enough oxygen for a stoichiometric reaction.

It can be seen from the table below that based on the heat of combustion calculation provided in ASHRAE Standard 34 section 6.1.3.6, it is possible to have from 0.1 wt % to 23.8 wt % of propylene combined with HFO-1234yf and still meet the heat of combustion requirements for ASHRAE class 2 flammability (HOC <19 KJ/kg.)

TABLE 2

| Refrigerants | Toxicity Class per ASHRAE 34 or estimated from TLV | Heat of Combustion[HOC] (KJ/kg) estimated per ASHRAE Std 34 Method | ASHRAE Std 34 Flammability Class based on HOC |
|---|---|---|---|
| R-1234yf | A | 10.7 | 2 L |
| R-1270 | A | 43.8 | 3 |
| R-1234yf/R-1270 (99 wt %/1 wt %) | A | 11.1 | 2 |
| R-1234yf/R-1270 (95 wt %/5 wt %) | A | 12.6 | 2 |
| R-1234yf/R-1270 (90 wt %/10 wt %) | A | 14.4 | 2 |
| R-1234yf/R-1270 (76.2 wt %/23.8 wt %) | A | 19.0 | 2 |

When the HFO component and the HC components are blended together in even more precise proportions, the resulting blend has class 2L flammability as defined by ANSI/ASHRAE standard 34 and ISO 817. Class 2L flammability is inherently much less flammable (i.e., lower energy release as exemplified by the Heat of Combustion or HOC value) than class 3 flammability and can be managed in automotive heating/cooling systems.

TABLE 3

| Refrigerants | Toxicity Class per ASHRAE 34 or estimated from TLV | LFL (vol %) per ASTM E681 | LFL (kg/m3) | Heat of Combustion[HOC] (KJ/kg) estimated per ASHRAE Std 34 Method | ASHRAE Std 34 Flammability Class based on HOC |
|---|---|---|---|---|---|
| HFO-1234yf | A | 6.2 | 0.289 | 10.7 | 2 L |
| R-1270 | A | 2.1 | 0.047 | 46.4 | 3 |
| R-1234yf/R-1270 (95 wt %/5 wt %) | A | 4.75 | 0.204 | 12.8 | 2 |

It is also possible to blend the HFO component and HC component and add a flame suppressant such that the resulting blend has class 2L flammability as defined by ANSI/ASHRAE standard 34 and ISO 817. Class 2L flammability is inherently much less flammable (i.e., lower energy release as exemplified by the Heat of Combustion or HOC value) than class 3 flammability and can be managed in automotive heating/cooling systems. An example of this is adding CF3I or other known flame suppressant such that the refrigerant blend properties are not impacted and the resultant blend is class 2L flammable. It is even possible to add enough flame suppressant to reduce the flammability such the resultant blend is class 1 and does not exhibit flame propagation.

The toxicity of these components has also been reviewed by WEEL or similar toxicological type committee and found to have toxicity values greater than 400 ppm and therefore classified by ANSI/ASHRAE standard 34 and ISO 817 as class A or low toxicity level.

Compositions of the present invention azeotrope-like and/or near-azeotropic properties over temperature ranges desirably employed in thermal management systems. Azeotrope-like and/or near-azeotropic compositions exhibit low temperature glide when used in thermal management systems, such as refrigeration or air conditioning systems. In some embodiments, the compositions exhibit azeotrope-like and/or near-azeotropic properties at both the desired evaporator and condenser operating temperatures.

Mixtures of HFO-1234yf and propylene may exhibit azeotrope-like and/or near-azeotropic properties over one or more concentration ranges depending on the temperature and pressure. In some embodiments, a refrigerant composition of HFO-1234yf and propylene may exhibit near-azeotropic properties over a range of concentrations from a propylene NAL1 to a propylene NAH1. In some embodiments, a refrigerant composition of HFO-1234yf and propylene may exhibit azeotrope-like and/or near-azeotropic properties over a range of concentrations from a propylene NAL2 to a propylene NAH2. In some embodiments, a propylene NAL1 to a propylene NAH1 and a propylene NAL2 to a propylene NAH2 ranges overlap.

It will also be understood that inventive compositions exhibiting near-azeotropic properties may possess HFO-1234yf concentrations as part of the HFO-1234yf/propylene compositions between the HFO-1234yf concentration corresponding to a propylene NAL1 and the HFO-1234yf concentration corresponding to a propylene NAH1. Similarly, the compositions associated with a propylene NAL2, a propylene NAH2, and the compositions exhibiting near-azeotropic having HFO-1234yf concentrations between a propylene NAL2 and a propylene NAH2 may be as described above.

In some embodiments, a refrigerant composition of HFO-1234yf and propylene may exhibit azeotrope-like properties over a range of concentrations from a propylene ALL1 to a propylene ALH1. In some embodiments, a refrigerant composition of HFO-1234yf and propylene may exhibit azeotrope-like and/or near-azeotropic properties over a range of concentrations from a propylene ALL2 to a propylene ALH2. In some embodiments, a propylene ALL1 to a propylene ALH1 and a propylene ALL2 to a propylene ALH2 ranges overlap.

It will also be understood that inventive compositions exhibiting near-azeotropic properties may possess HFO-1234yf concentrations as part of the HFO-1234yf/propylene compositions between the HFO-1234yf concentration corresponding to a propylene AAL1 and the HFO-1234yf concentration corresponding to a propylene AAH1. Similarly, the compositions associated with a propylene AAL2, a propylene AAH2, and the compositions exhibiting near-azeotropic having HFO-1234yf concentrations between a propylene AAL2 and a propylene AAH2 may be as described above.

One aspect of the invention is shown in FIG. 1. In the example of FIG. 1, the percent deviation between bubble point and dew point pressure based on bubble point pressure of R-1234yf/Propylene at 0° C. is illustrated. The system is a near azeotrope from a propylene NAL1 (610) of 0 to a propylene NAH1 (650) of about 60.4 weight percent R-1234yf and 100 to about 39.6 weight percent propylene at a temperature of about 0° C. The system is also near azeotropic from a propylene NAL2 (660) of about 98.4 to a propylene NAH2 (640) of 100 weight percent R-1234yf and about 1.6 to 0 weight percent propylene at a temperature of about 0° C.

The system is an azeotrope-like from and a propylene ALL1 (615) of 0 to a propylene ALH1 (620) of about 54.2 weight percent R-1234yf and 100 to about 45.8 weight percent propylene at a temperature of about 0° C. The system is also azeotrope-like from a propylene ALL2 (630) of about 99.1 to a propylene ALH2 (645) of 100 weight percent R-1234yf and about 0.9 to 0 weight percent propylene at a temperature of about 0° C.

Figure 2:
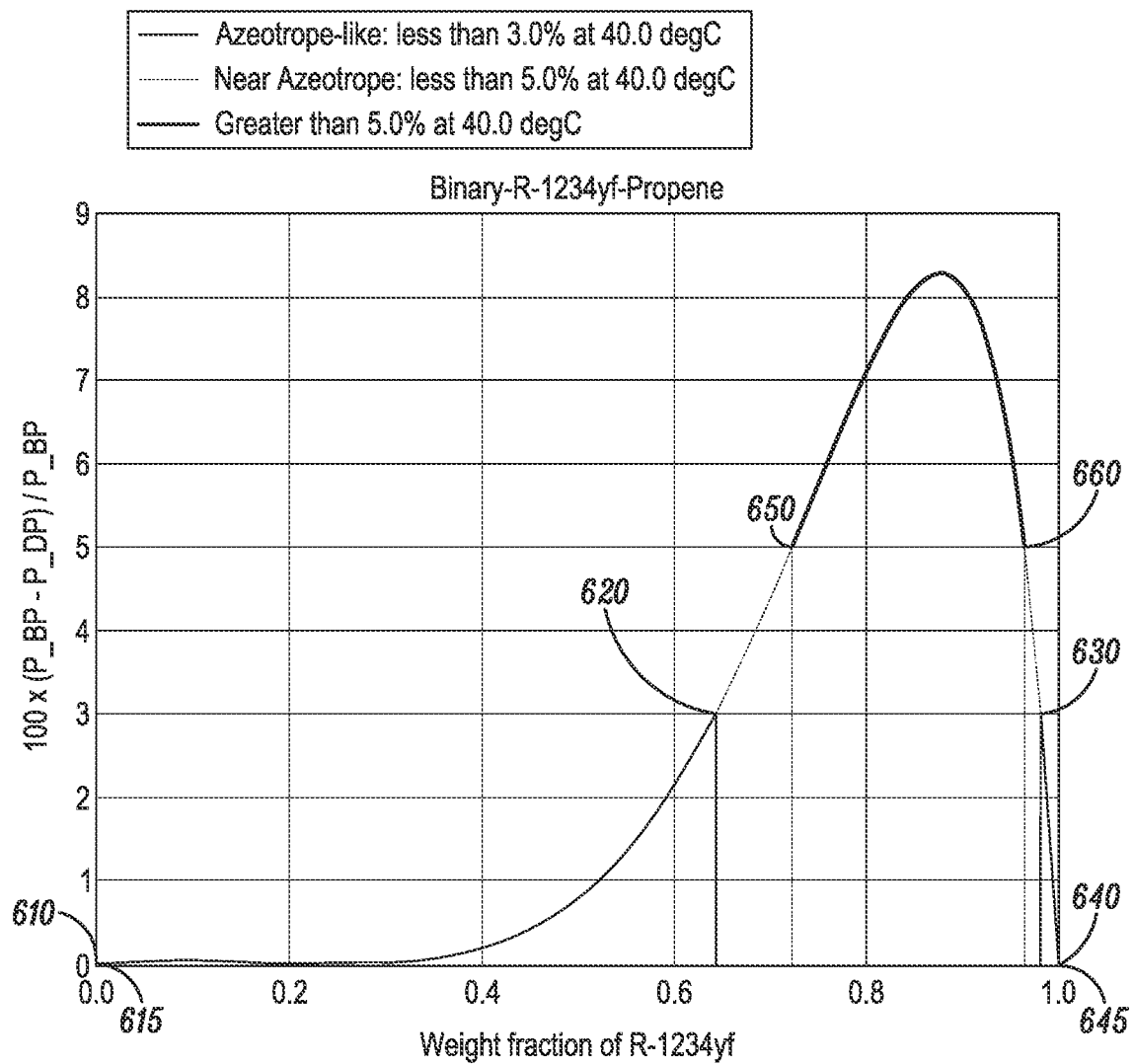
FIG. 2 illustrates the vapor/liquid equilibrium properties of blends of HFO-1234yf and propylene, according to an embodiment.

Another aspect of the invention is shown in FIG. 2. In the example of FIG. 2, the percent deviation between bubble point and dew point pressure based on bubble point pressure of R-1234yf/Propylene at 40° C. is illustrated. The system is a near azeotrope from a propylene NAL1 (610) about 0 to a propylene NAH1 (650) of about 72.3 weight percent R-1234yf and about 100 to about 27.7 weight percent propylene at a temperature of about 40° C. The system is also a near azeotrope from a propylene NAL2 (660) of about 96.4 to a propylene NAH2 (640) of 100 weight percent R-1234yf and about 3.6 to 0 weight percent propylene at a temperature of about 40° C.

The system is azeotrope-like from a propylene ALL1 (615) of 0 to a propylene ALH1 (620) of about 64.4 weight percent R-1234yf and 100 to about 35.6 weight percent propylene at a temperature of about 40 degrees Celsius. The system is also azeotrope-like from a propylene ALL2 (630) of about 98.2 to a propylene ALH2 (645) of 100 weight percent R-1234yf and about 1.8 to 0 weight percent propylene at a temperature of about 40 degrees Celsius.

This system as an azeotrope that ranges from about 21.5 to 26.1 weight percent R-1234yf and about 78.5 to about 73.9 weight percent propylene over the temperature range of at least 0 to 40° C.

In embodiments, the refrigerant blends include 2,3,3,3-tetrafluoropropene (HFO-1234yf) and propylene (R-290). In some embodiments, the refrigerant blends may consist of 2,3,3,3-tetrafluoropropene (HFO-1234yf) and propylene (R-290). In some embodiments, the refrigerant blends may comprise blends ranging from 1 weight percent propylene to 10 weight percent propylene. More specifically, the blend may contain from 5 weight percent to 10 weight percent propylene and even more specifically from 5 weight percent to 7 weight percent of propylene.

While HFO-1234yf can be used as an air-conditioning refrigerant, it is limited in its ability to perform as a heat pump type fluid, i.e. in cooling and heating mode or in a reversible cycle system. Therefore, the refrigerants noted herein uniquely provide improved capacity over HFO-1234yf in the heating operating range, extend the lower heating range capability over HFO-1234yf to −30° C., have extremely low GWP and low to mild flammability, while also uniquely exhibiting low or nearly negligible glide. Hence these refrigerants are most useful in electrified vehicle applications, particularly HEV, PHEV, MHEV, EV and mass transport vehicles which require these properties over the lower end heating range. It should also be noted that any heat pump type fluid also needs to perform well in the air-conditioning range, i.e. up to 40° C., providing increased capacity versus HFO-1234yf. Therefore, the refrigerant blends noted herein perform well over a range of temperatures, particularly from −30° C. up to +40° C. and can provide heating and/or cooling depending upon which cycle they are being used in the heat pump system.

Figure 3:
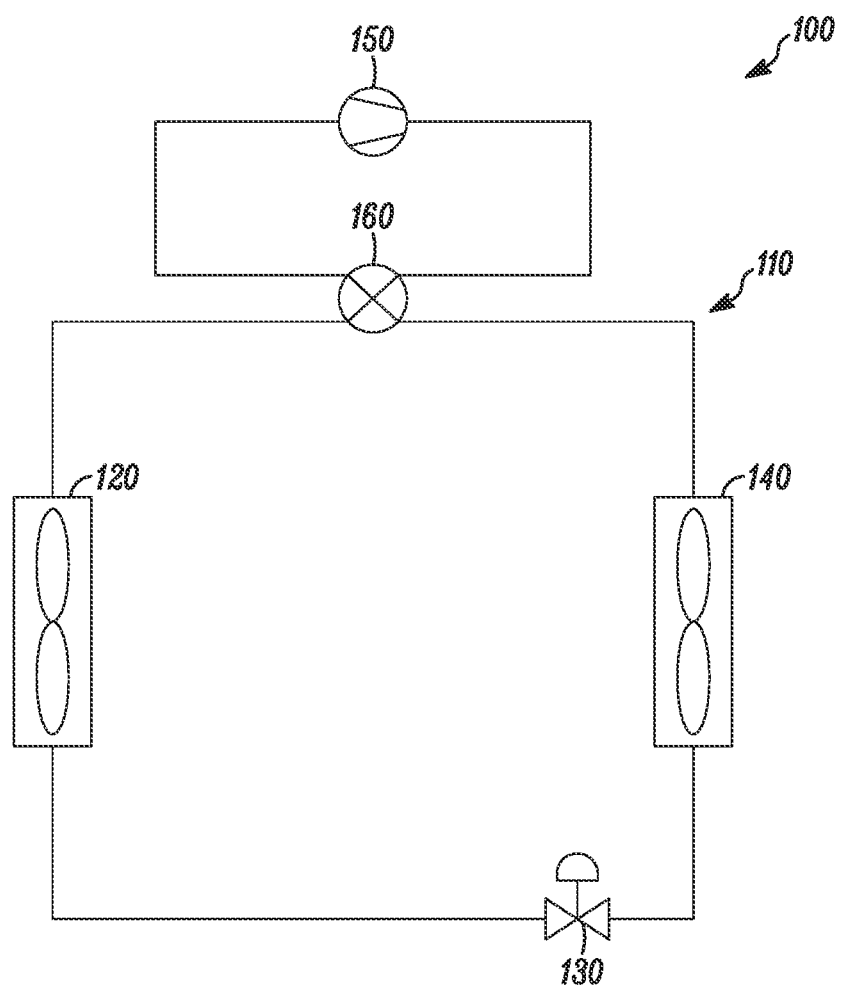
FIG. 3 illustrates a reversible cooling or heating loop system, according to an embodiment.

The refrigerant blends may be used in a variety of heating and cooling systems. In the embodiment of FIG. 3, a refrigeration system 100 having a refrigeration loop 110 comprises a first heat exchanger 120, a pressure regulator 130, a second heat exchanger 140, a compressor 150 and a four-way valve 160. The first and second heat exchangers are of the air/refrigerant type. The first heat exchanger 120 has passing through it the refrigerant of the loop 110 and the stream of air created by a fan. All or some of this same air stream may also pass through a heat exchanger an external cooling circuit, such as an engine (not depicted in FIG. 3). Likewise, the second heat exchanger 140 has passing through it an air stream created by a fan. All or some of this air stream may also pass through another external cooling circuit (not depicted in FIG. 3). The direction in which the air flows is dependent on the mode of operation of the loop 110 and on the requirements of the external cooling circuit. Thus, in the case of an engine, when the engine is idle and the loop 110 is in heat pump mode, the air can be heated up by the heat exchanger of the engine cooling circuit and then blown onto the heat exchanger 120 to speed up the evaporation of the fluid of the loop 110 and thus improve the performance of this loop. The heat exchangers of the cooling circuit may be activated by valves according to engine requirements, such as, heating of the air entering the engine or putting the energy produced by this engine to productive use.

In refrigeration mode, the refrigerant set in motion by the compressor 150 passes, via the valve 160, through the heat exchanger 120 which acts as a condenser, that is to say gives up heat energy to the outside, then through the pressure regulator 130 then through the heat exchanger 140 that is acting as an evaporator thus cooling the stream of air intended to be blown into the motor vehicle cabin interior.

In heat pump mode, the direction of flow of the refrigerant is reversed using the valve 160. The heat exchanger 140 acts as a condenser while the heat exchanger 120 acts as an evaporator. The heat exchanger 140 can then be used to heat up the stream of air intended for the motor vehicle cabin.

Figure 4:
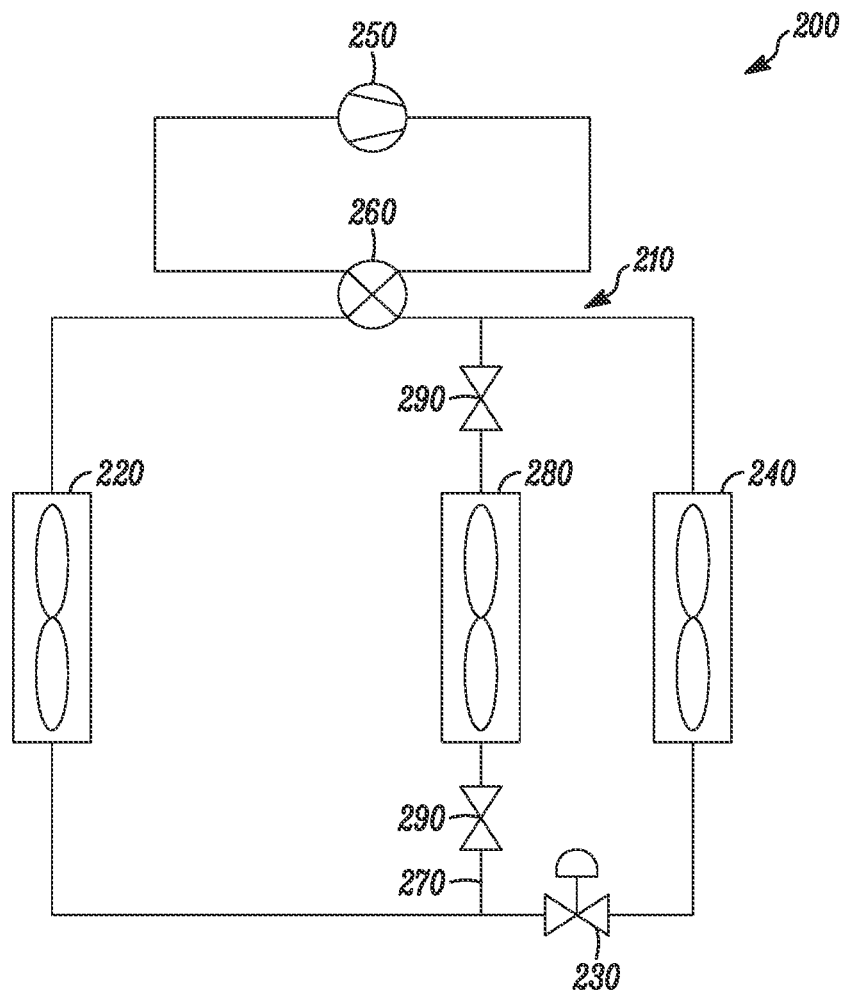
FIG. 4 illustrates a reversible cooling or heating loop system, according to an embodiment.

In the embodiment of FIG. 4, a refrigeration system 200 having a refrigeration loop 210 comprises a first heat exchanger 220, a pressure regulator 230, a second heat exchanger 240, a compressor 250, a four-way valve 260, and a branch-off 270 mounted, on the one hand, at the exit of the heat exchanger 220 and, on the other hand, at the exit of the heat exchanger 240 when considering the direction of flow of the fluid in refrigeration mode. This branch comprises a heat exchanger 280 through which there passes a stream of air or stream of exhaust gas which is intended to be admitted to the engine and a pressure regulator 280. The first and second heat exchangers 220 and 240 are of the air/refrigerant type. The first heat exchanger 220 has passing through it the refrigerant from the loop 210 and the stream of air introduced by a fan. All or some of this same air stream also passes through a heat exchanger of the engine cooling circuit (not depicted in FIG. 4). Likewise, the second exchanger 240 has, passing through it, a stream of air conveyed by a fan. All or some of this air stream also passes through another heat exchanger of the engine cooling circuit (not depicted in FIG. 4). The direction in which the air flows is dependent on the mode of operation of the loop 210 and on the engine requirements. By way of example, when the combustion engine is idle and the loop 210 is in heat pump mode, the air may be heated by the heat exchanger of the engine cooling circuit and then blown onto the heat exchanger 220 to accelerate the evaporation of fluid of the loop 210 and improve the performance of this loop. The heat exchangers of the cooling circuit may be activated by valves according to engine requirements, such as, heating of the air entering the engine or putting the energy produced by this engine to productive use.

The heat exchanger 280 may also be activated according to energy requirements, whether this is in refrigeration mode or in heat pump mode. Shut-off valves 290 can be installed on the branch 270 to activate or deactivate this branch.

A stream of air conveyed by a fan passes through the heat exchanger 280. This same air stream may pass through another heat exchanger of the engine cooling circuit and also through other heat exchangers placed in the exhaust gas circuit, on the engine air inlet or on the battery in the case of hybrid motorcars.

Figure 5:
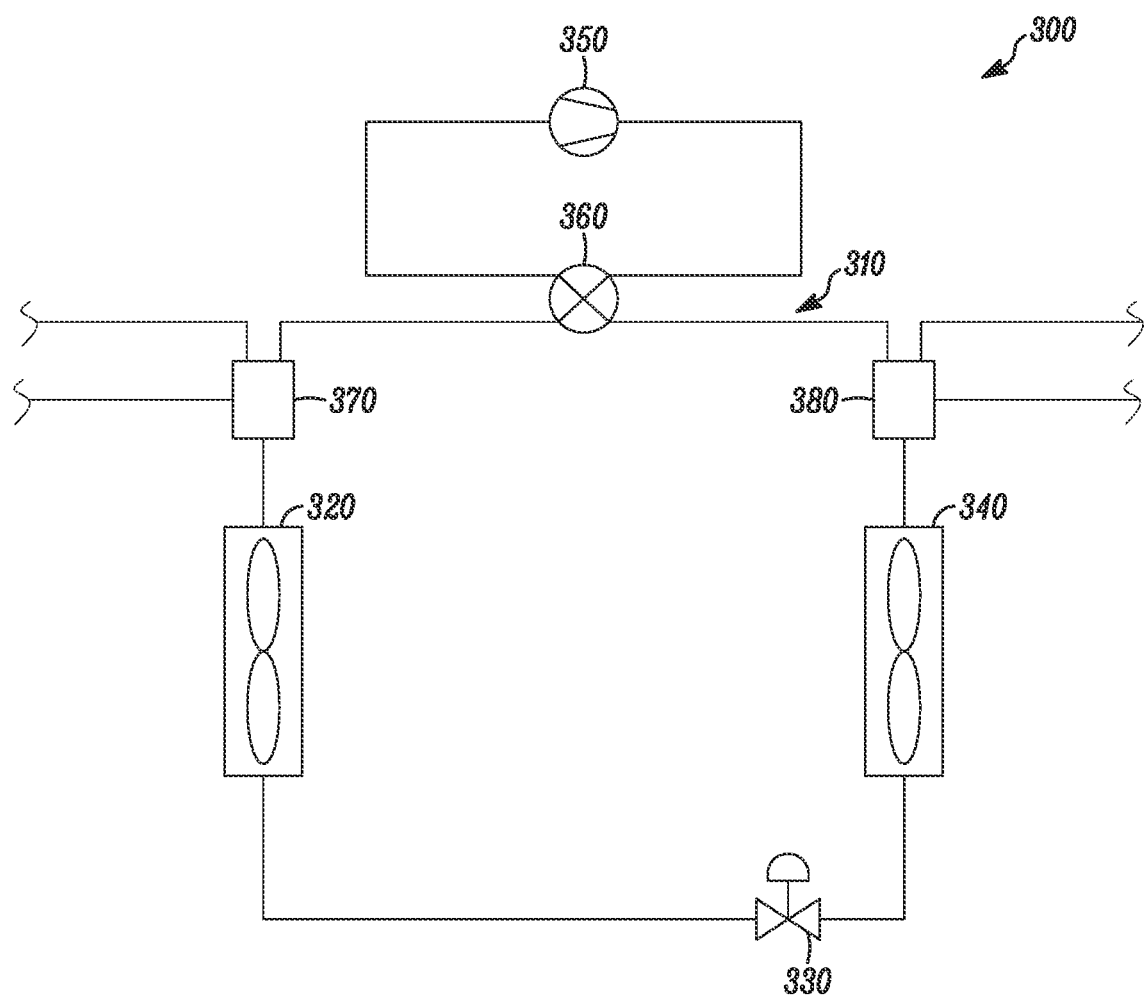
FIG. 5 illustrates a reversible cooling or heating loop system, according to an embodiment.

In the embodiment of FIG. 5, a refrigeration system 300 having a refrigeration loop 310 comprises a first heat exchanger 320, a pressure regulator 330, a second heat exchanger 340, a compressor 350 and a four-way valve 360. The first and second heat exchangers 320 and 340 are of the air/refrigerant type. The way in which the heat exchangers 320 and 340 operate is the same as in the first embodiment depicted in FIG. 6. Two fluid/liquid heat exchangers 370 and 380 are installed both on the refrigeration loop circuit 310 and on the engine cooling circuit or on a secondary glycol-water circuit. Installing fluid/liquid heat exchangers without going through an intermediate gaseous fluid (air) contributes to improving heat exchange by comparison with air/fluid heat exchangers.

Figure 6:
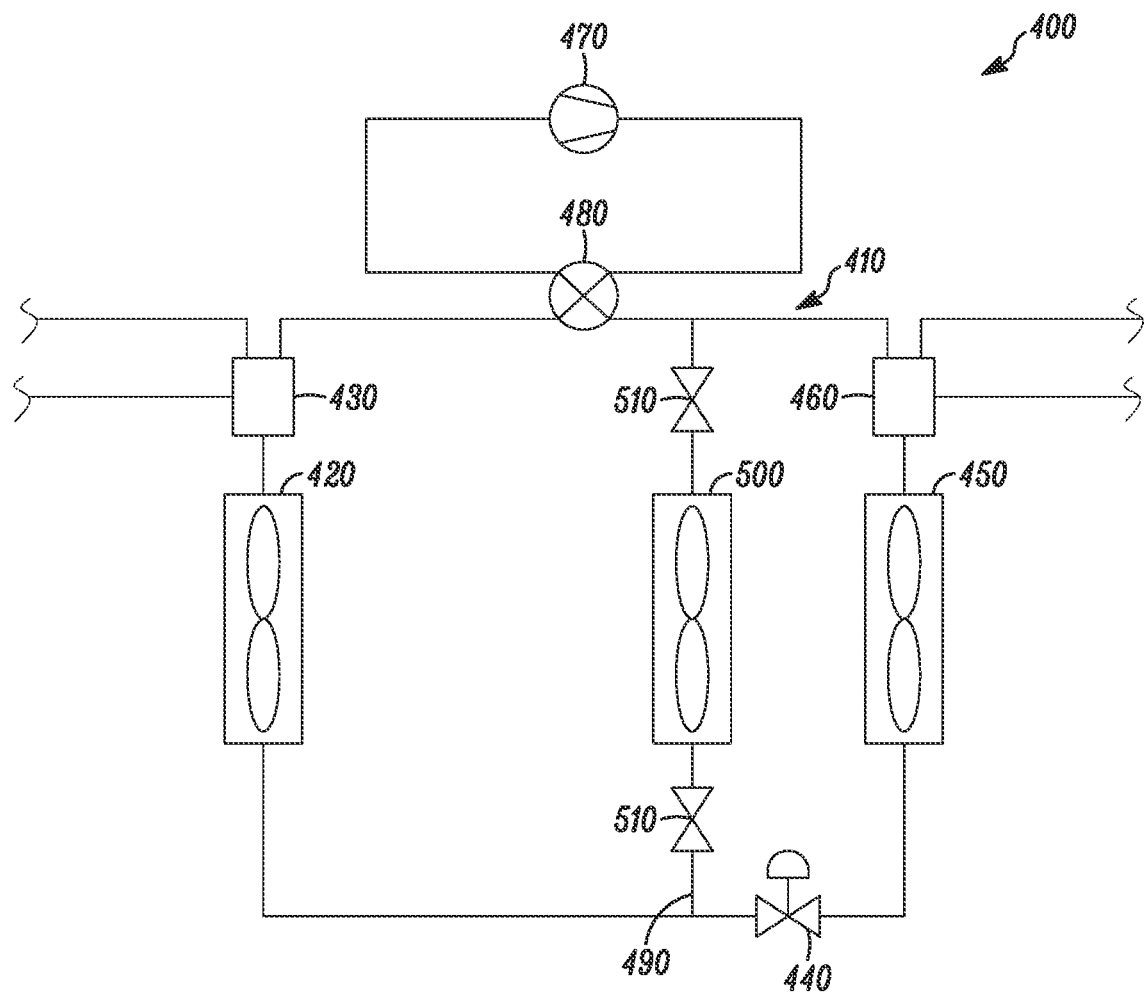
FIG. 6 illustrates a reversible cooling or heating loop system, according to an embodiment.

In the embodiment of FIG. 6, a refrigeration system 400 having a refrigeration loop 410 comprises a first series of heat exchangers 420 and 430, a pressure regulator 440, a second series of heat exchangers 450 and 460, a compressor 470 and a four-way valve 480. A branch-off 490 mounted, on the one hand, at the exit of the heat exchanger 420 and, on the other hand, at the exit of the heat exchanger 460, when considering the circulation of the fluid in refrigerant mode. This branch comprises a heat exchanger 500 through which there passes a stream of air or a stream of exhaust gases intended to be admitted to a combustion engine and a pressure regulator 510.

The heat exchangers 420 and 450 are of the air/refrigerant type and the heat exchangers 430 and 460 are of the liquid/refrigerant type. The way in which these heat exchangers work is the same as in the third embodiment depicted in FIG. 5.

EXAMPLES

Thermodynamic Modeling Comparison for the Heat Pump Systems
Heating Mode: Propylene A thermodynamic modeling program, Thermocycle 3.0, was used to model the expected performance of the blend versus HFO-1234yf./Propylene compared to HFO-1234yf Model conditions used for the heating mode are as follows, where heat exchanger #2 was varied in 10° C. increments:

| Heating Cycle Modeling Conditions | |
|---|---|
| Heat Exchanger #1- Inside Vehicle Cabin | 50° C. |
| Heat Exchange #2- Outside Air (Ambient Air Temp) | −30° C. to 10° C. |
| Return Gas Heated | 10° C. |
| Compressor Efficiency | 70% |

Modeling results for HFO-1234yf/Propylene ranging from 1 wt % to 10 wt %.

TABLE 4

Heat Exchanger #2 = −30° C.

| Refrigerant | Compressor Inlet Temp (° C.) | Compressor Disc Temp (° C.) | Compressor Inlet Pres (kPa) | Compressor Disc Pres (kPa) | Compressor Discharge Ratio | Heating Capacity (kJ/m3) | Relative (%) Heating Capacity vs R-1234yf | COP Heating | Relative (%) Heating COP vs R-1234yf | Ave Glide (K) |
|---|---|---|---|---|---|---|---|---|---|---|
| R-1234yf | −20 | 74.8 | 98.3 | 1299.7 | 13.2 | 831.6 | 100.0 | 2.18 | 100.0 | |
| R-1234yf (99%)/R-1270 (1%) | −20 | 76.0 | 101.2 | 1344.0 | 13.3 | 855.9 | 102.9 | 2.17 | 99.5 | 0.37 |
| R-1234yf (95%)/R-1270 (5%) | −20 | 79.7 | 113.4 | 1500.6 | 13.2 | 949.1 | 114.1 | 2.15 | 98.6 | 1.09 |
| R-1234yf (90%)/R-1270 (10%) | −20 | 82.9 | 129.5 | 1659.5 | 12.8 | 1060.2 | 127.5 | 2.12 | 97.2 | 0.99 |

TABLE 5

Heat Exchanger #2 = −20° C.

| Refrigerant | Compressor Inlet Temp (° C.) | Compressor Disc Temp (° C.) | Compressor Inlet Pres (kPa) | Compressor Disc Pres (kPa) | Compressor Discharge Ratio | Heating Capacity (kJ/m3) | Relative (%) Heating Capacity vs R-1234yf | COP Heating | Relative (%) Heating COP vs R-1234yf | Ave Glide (K) |
|---|---|---|---|---|---|---|---|---|---|---|
| R-1234yf | −10 | 71.2 | 149.9 | 1299.7 | 8.7 | 1204.9 | 100.0 | 2.53 | 100.0 | |
| R-1234yf (99%)/R-1270 (1%) | −10 | 72.2 | 154.5 | 1344.0 | 8.7 | 1239.6 | 102.9 | 2.52 | 99.6 | 0.34 |
| R-1234yf (95%)/R-1270 (5%) | −10 | 75.4 | 173.2 | 1500.6 | 8.7 | 1371.3 | 113.8 | 2.49 | 98.4 | 0.96 |
| R-1234yf (90%)/R-1270 (10%) | −10 | 78.1 | 197.2 | 1659.5 | 8.4 | 1524.0 | 126.5 | 2.46 | 97.2 | 0.80 |

TABLE 6

Heat Exchanger #2 = −10° C.

| Refrigerant | Compressor Inlet Temp (° C.) | Compressor Disc Temp (° C.) | Compressor Inlet Pres (kPa) | Compressor Disc Pres (kPa) | Compressor Discharge Ratio | Heating Capacity (kJ/m3) | Relative (%) Heating Capacity vs R-1234yf | COP Heating | Relative (%) Heating COP vs R-1234yf | Ave Glide (K) |
|---|---|---|---|---|---|---|---|---|---|---|
| R-1234yf | 0 | 68.4 | 220.5 | 1299.7 | 5.9 | 1699.1 | 100.0 | 3.00 | 100.0 | |
| R-1234yf (99%)/R-1270 (1%) | 0 | 69.3 | 227.3 | 1344.0 | 5.9 | 1747.6 | 102.9 | 2.99 | 99.7 | 0.30 |
| R-1234yf (95%)/R-1270 (5%) | 0 | 72.0 | 254.8 | 1500.6 | 5.9 | 1928.9 | 113.5 | 2.95 | 98.3 | 0.81 |
| R-1234yf (90%)/R-1270 (10%) | 0 | 74.2 | 289.4 | 1659.5 | 5.7 | 2132.4 | 125.5 | 2.91 | 97.0 | 0.61 |

TABLE 7

Heat Exchanger #2 = 0° C.

| Refrigerant | Compressor Inlet Temp (° C.) | Compressor Disc Temp (° C.) | Compressor Inlet Pres (kPa) | Compressor Disc Pres (kPa) | Compressor Discharge Ratio | Heating Capacity (kJ/m3) | Relative (%) Heating Capacity vs R-1234yf | COP Heating | Relative (%) Heating COP vs R-1234yf | Ave Glide (K) |
|---|---|---|---|---|---|---|---|---|---|---|
| R-1234yf | 10 | 66.2 | 314.2 | 1299.7 | 4.1 | 2342.3 | 100.0 | 3.68 | 100.0 | |
| R-1234yf (99%)/R-1270 (1%) | 10 | 67.0 | 324.0 | 1344.0 | 4.1 | 2408.8 | 102.8 | 3.66 | 99.5 | 0.26 |
| R-1234yf (95%)/R-1270 (5%) | 10 | 69.2 | 363.2 | 1500.6 | 4.1 | 2653.1 | 113.3 | 3.61 | 98.1 | 0.67 |
| R-1234yf (90%)/R-1270 (10%) | 10 | 71.0 | 410.9 | 1659.5 | 4.0 | 2917.0 | 124.5 | 3.56 | 96.7 | 0.43 |

TABLE 8

Heat Exchanger #2 = 10° C.

| Refrigerant | Compressor Inlet Temp (° C.) | Compressor Disc Temp (° C.) | Compressor Inlet Pres (kPa) | Compressor Disc Pres (kPa) | Compressor Discharge Ratio | Heating Capacity (kJ/m3) | Relative (%) Heating Capacity vs R-1234yf | COP Heating | Relative (%) Heating COP vs R-1234yf | Ave Glide (K) |
|---|---|---|---|---|---|---|---|---|---|---|
| R-1234yf | 20 | 64.5 | 435.5 | 1299.7 | 3.0 | 3168.1 | 100.0 | 4.70 | 100.0 | |
| R-1234yf (99%)/R-1270 (1%) | 20 | 65.1 | 449.3 | 1344.0 | 3.0 | 3257.9 | 102.8 | 4.68 | 99.6 | 0.22 |
| R-1234yf (95%)/R-1270 (5%) | 20 | 78.1 | 503.6 | 1500.6 | 3.0 | 3693.6 | 116.6 | 4.72 | 100.4 | 0.52 |
| R-1234yf (90%)/R-1270 (10%) | 20 | 68.3 | 567.3 | 1659.5 | 2.9 | 3915.8 | 123.6 | 4.55 | 96.8 | 0.29 |

Modeling results show that blends of HFO-1234yf with R-1270 from 1 wt % to 10 wt % provide a significant advantage over neat HFO-1234yf. At −30° C. ambient temperatures, HFO-1234yf alone does not perform well. The compressor inlet pressure is sub-atmospheric and air would be pulled into the compressor (tables 4). Therefore, HFO-1234yf is limited for use as a heat pump fluid to −20° C. without some sort of system redesign. However, even 1 wt % R-1270 (propylene) significantly improves the performance of the resultant blend with HFO-1234yf (99 wt %)/R-1270 (1 wt %) being able to operate at temperatures down to −30° C. Therefore, the inventive blends of HFO-1234yf/R-1270 extend the heating range by a delta of at least 10° C.

Blends of HFO-1234yf with R-1270 (propylene) from 1 wt % to 10 wt % also provide a significant advantage over neat HFO-1234yf in terms of improved heating capacity. Modeling results show that even 1 wt % of R-1270 has over 2.9% heat capacity improvement while up to 10% propylene can significantly improve the relative heat capacity up to 27.5%. The improved heating capacity of the inventive blends shows that the new fluids can easily be used to provide adequate heat to a passenger cabin. Additionally, the resultant inventive blends generally have a similar or reduced compressor discharge ratio versus neat HFO-2134yf over the heat pump operating range.

Modeling shows that blends of HFO-1234yf and R-1270 (propylene) from 1 wt % to 5 wt % have similar COP or energy performance in the heating range of −30° C. to +10° C. Blends of HFO-1234yf and R-1270 (propylene) from >5 wt % up to 10 wt % have adequate COP in the heating range.

Additionally, blends which contain 1 to 10 wt % R-1270 (propylene) also exhibit near negligible glide over the desired heating range, i.e., from −30° C. up to 10° C. Therefore, the R-1270 blends have extremely favorable glide and can be serviced as near azeotropic blends over the entire heating range without limitation.

Therefore, the HFO-1234yf/R-1270 refrigerant blends noted herein uniquely provide improved capacity 2.9% to 27% over HFO-1234yf in the heating operating range from −30° C. to +10° C., extend the lower heating range capability over HFO-1234yf by a delta of 10° C., have extremely low GWP (less than 10) and low to mild flammability (class 2 to class 2L), while also uniquely exhibiting nearly negligible glide over heating range for servicing.

While all blends of HFO-1234yf and R-1270 would be desirable, the preferred blends with advantageous flammability for a heat pump fluid are 99 wt % HFO-1234yf to 76.2 wt % HFO-1234yf and 1 wt % R-1270 to 23.8 wt % R-1270, with more preferred blends being 99 wt % HFO-1234yf to 90 wt % HFO-1234yf and 1 wt % to 10 wt % R-1270 and most preferred blend being 99% HFO-1234yf to 93 wt % HFO-1234yf and 1 wt % R-1270 to 7 wt % R-1270.

Thermodynamic Modeling Comparison for the Heat Pump Systems

Cooling Mode: Propylene

A thermodynamic modeling program, Thermocycle 3.0, was used to model the expected performance of the blend versus HFO-1234yf compared to HFO-1234yf/Propylene. Model conditions used for the cooling mode are as follows, where heat exchanger #2 was varied in 10 C increments:

| Modeling Conditions | |
|---|---|
| Heat Exchanger #1- Inside Cabin | 0° C. |
| Heat Exchange #2- Outside Air (Ambient Air Temp) | 20° C. to 40° C. |

TABLE 9

Heat Exchanger #2 T = 20° C.

| Refrigerant | Compr Inlet Temp (° C.) | Compressor Disc Temp (° C.) | Compressor Inlet Pres (kPa) | Compressor Disc Pres (kPa) | Compressor Discharge Ratio | Cooling Capacity (kJ/m3) | Relative (%) Cooling Cap vs R-1234yf | COP Cooling | Relative Cooling COP vs R-1234yf | Ave Glide (K) |
|---|---|---|---|---|---|---|---|---|---|---|
| R-1234yf | 10 | 33.7 | 314.2 | 589.3 | 1.9 | 2437.2 | 100.0 | 8.58 | 100.0 | |
| R-1234yf (99%)/Propylene (1%) | 10 | 34.1 | 327.2 | 615.2 | 1.9 | 2532.2 | 103.9 | 8.53 | 99.4 | 0.20 |
| R-1234yf (95%)/Propylene (5%) | 10 | 35.0 | 376.2 | 703.7 | 1.9 | 2865.2 | 117.6 | 8.47 | 98.7 | 0.38 |
| R-1234yf (90%)/Propylene (10%) | 10 | 35.3 | 428.7 | 789.4 | 1.8 | 3181.2 | 130.5 | 8.46 | 98.6 | 0.14 |

TABLE 10

Heat Exchanger #2 T = 30° C.

| Refrigerant | Compr Inlet Temp (° C.) | Compressor Disc Temp (° C.) | Compressor Inlet Pres (kPa) | Compressor Disc Pres (kPa) | Compressor Discharge Ratio | Cooling Capacity (kJ/m3) | Relative (%) Cooling Cap vs R-1234yf | COP Cooling | Relative Cooling COP vs R-1234yf | Ave Glide (K) |
|---|---|---|---|---|---|---|---|---|---|---|
| R-1234yf | 10 | 44.8 | 314.2 | 780.8 | 2.5 | 2204.46 | 100.0 | 5.36 | 100.0 | |
| R-1234yf (99%)/Propylene (1%) | 10 | 45.4 | 325.9 | 812.2 | 2.5 | 2279.9 | 103.4 | 5.33 | 99.4 | 0.24 |
| R-1234yf (95%)/Propylene (5%) | 10 | 46.7 | 371.3 | 920.5 | 2.5 | 2552.4 | 115.8 | 5.27 | 98.3 | 0.51 |
| R-1234yf (90%)/Propylene (10%) | 10 | 47.6 | 422.8 | 1027.4 | 2.4 | 2827.8 | 128.3 | 5.25 | 97.9 | 0.24 |

TABLE 11

Heat Exchanger #2 T = 40° C.

| Refrigerant | Compr Inlet Temp (° C.) | Compressor Disc Temp (° C.) | Compressor Inlet Pres (kPa) | Compressor Disc Pres (kPa) | Compressor Discharge Ratio | Cooling Capacity (kJ/m3) | Relative (%) Cooling Cap vs R-1234yf | COP Cooling | Relative Cooling COP vs R-1234yf | Ave Glide (K) |
|---|---|---|---|---|---|---|---|---|---|---|
| R-1234yf | 10 | 55.6 | 314.2 | 1015.6 | 3.2 | 1961.5 | 100.0 | 3.71 | 100.0 | |
| R-1234yf (99%)/R-1270(1%) | 10 | 56.3 | 324.8 | 1053.1 | 3.2 | 2020.8 | 103.0 | 3.69 | 99.5 | 0.26 |
| R-1234yf (95%)/R-1270 (5%) | 10 | 58.1 | 367.0 | 1184.1 | 3.2 | 2238.4 | 114.1 | 3.63 | 97.8 | 0.61 |
| R-1234yf (90%)/R-1270(10%) | 10 | 59.4 | 416.8 | 1315.3 | 3.2 | 2468.1 | 125.8 | 3.60 | 97.0 | 0.34 |

For any heat pump fluid to be a viable candidate, it needs to also perform well in the cooling mode, i.e. in higher ambient temperatures it needs to provide adequate cooling. Modeling results show that blends of HFO-1234yf with R-1270 from 1 wt % to 10 wt % provide a significant advantage over neat HFO-1234yf in the cooling range from 20° C. up to 40° C. ambient.

Blends of HFO-1234yf with R-1270 (propylene) from 1 wt % to 10 wt % also provide a significant advantage over neat HFO-1234yf in terms of improved cooling capacity. Modeling results show that even 1 wt % of R-1270 has over 2% heat capacity improvement while up to 10% propylene can significantly improve the relative cooling capacity up to 22%. The improved cooling capacity of the inventive blends shows that the new fluids can easily be used to provide adequate cooling (air-conditioning) to a passenger cabin. Additionally, the resultant inventive blends generally have a similar compressor discharge ratio versus neat HFO-2134yf over the cooling operating range.

Modeling shows that blends of HFO-1234yf and R-1270 (propylene) from 1 wt % to 10 wt % have similar COP or energy performance in the cooling range from +20° C. to +40° C.

Additionally, blends which contain 1 to 10 wt % R-1270 (propylene) also exhibit negligible glide over the desired cooling range, i.e., from +20° C. to +40° C. Therefore, this inventive blend can be serviced in almost any ambient environment.

Therefore, the HFO-1234yf/R-1270 refrigerant blends noted herein uniquely provide improved capacity 2% to 22% over HFO-1234yf in the cooling operating range from +20 to +40 C, have extremely low GWP (less than 10) and low to mild flammability (class 2 to class 2L), while also uniquely exhibiting nearly negligible glide for all heat pump operating temperatures.

While all blends of HFO-1234yf and R-1270 would be desirable, the preferred blends with advantageous flammability for a heat pump (i.e. operating in the heating or cooling mode) fluid are 99 wt % HFO-1234yf to 78 wt % HFO-1234yf and 1 wt % R-1270 to 22 wt % R-1270, with more preferred blends being 99 wt % HFO-1234yf to 80 wt % HFO-1234yf and 1 wt % to 20 wt % R-1270 and most preferred blend being 99% HFO-1234yf to 90 wt % HFO-1234yf and 1 wt % R-1270 to 10 wt % R-1270.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising:
   (a) a binary refrigerant component,
   (b) an HFO-1234yf stabilizer component, and
   (c) an optional lubricating component having a kinematic viscosity at 40° C., according to ASTM D445, between 75-110 cSt,
   (d) said refrigerant component is a binary mixture of 2,3,3,3-tetrafluoropropene (HFO-1234yf) and propylene (R-1270), the R-1270 is present in an amount of up to 23.8 weight percent,
   (e) said HFO-1234yf stabilizer component comprises from 0.01 up to 1 wt. % of one of d-limonene, alpha-pinene, beta-pinene and tocopherol, and
   (f) said optional lubricating component comprises at least one polyol ester (POE),
   wherein the composition is near-azeotropic over a temperature range between −30° C. to 40° C. with a glide of less than about 0.75 K at temperature of 40° C., soluble in a lubricant at temperatures over the range extending between about −35° C. and about 100° C.

2. The composition of claim 1, wherein the propylene (R-1270) is present in an amount of from 15 to 20 weight percent based on the total amount of the refrigerant component.

3. The composition of claim 1, wherein the heat capacity of the refrigerant component is between 2.9% and 27.5% greater than the heat capacity of 2,3,3,3-tetrafluoropropene (HFO-1234yf) alone.

4. The composition of claim 1, wherein the heat capacity of the refrigerant component is between 2% and 22% greater than the heat capacity of 2,3,3,3-tetrafluoropropene (HFO-1234yf) alone.

5. The composition of claim 1, wherein the GWP of the refrigerant composition is less than 10.

6. The composition of claim 1:
   wherein the heat capacity ratio of the refrigerant component and 2,3,3,3-tetrafluoropropene (HFO-1234yf) is between 1.05 and 1.50 at the same temperature and pressure.

7. A heating or cooling system comprising, in a serial arrangement:
a condenser;
an evaporator; and
a compressor, the system further comprising each of the condenser, evaporator and compressor operably connected, the refrigerant composition of claim 1 being circulated through each of the condenser, evaporator and compressor.

8. The heating or cooling system of claim 7:
wherein the system is an air conditioner for an automotive system.

9. The heating or cooling system of claim 7:
wherein the system is an air conditioner for a stationary cooling system.

10. The heating or cooling system of claim 7:
further comprising a 4-way valve.

11. The heating or cooling system of claim 7:
wherein the system is a heat pump for an automotive system.

12. The refrigeration system of claim 7:
wherein the system is heat pump for a residential heating or cooling system.

13. A heat pump system comprising the refrigerant composition of claim 1.

14. An HEV, MHEV, PHEV, or EV heat pump system comprising (a) a binary refrigerant component consisting essentially of HFO-1234yf and at most 23.8 wt. % R-1270, (b) a stabilizer component selected from of d-limonene, alpha-pinene, beta-pinene and tocopherol in an amount of from 0.01 up to 1 wt. %, and optionally, (c) a HFO-1234yf/R-1270 compatible lubricant, wherein the difference between the bubble point pressure ("BP") and dew point pressure ("DP") of the binary refrigerant component is defined as $[(BP-DP)/BP] \times 100 \leq 5$ over the temperature range of $-30°$ C. to $40°$ C., and wherein the binary refrigerant component has a temperature glide of less than 0.75 Kelvin (K) at a temperature of $-30°$ C. up to $10°$ C.

15. An HEV, MHEV, PHEV, or EV heat pump system in combination with a vehicle electrical system comprising the composition of claim 1.

16. A method of charging a refrigerant composition to an automotive system comprising: providing the composition of claim 1 to an automotive heating or cooling system.

17. A method comprising:
(a) providing refrigerant composition (i) a refrigerant component, (ii) an HFO-1234yf stabilizer component, and (iii) an optional lubricating component having a kinematic viscosity at $40°$ C. between 75 and 110 cSt,
(b) said refrigerant component consists essentially of 2,3,3,3-tetrafluoropropene (HFO-1234yf) and propylene (R-1270) in an amount of about 1 wt. % up to 23.8 weight percent,
(c) said HFO-1234yf stabilizer component comprises one of d-limonene, alpha-pinene, beta-pinene and tocopherol in an amount from 0.01 up to 1 wt. %, and
(d) charging one of an automotive system or a heat pump of an electrical vehicle system with the composition; and heating or cooling with the composition.

* * * * *